United States Patent
Roszman et al.

(10) Patent No.: US 9,686,904 B2
(45) Date of Patent: Jun. 27, 2017

(54) SEED DELIVERY SYSTEM VIBRATOR

(71) Applicant: CNH Industrial America LLC, New Holland, PA (US)

(72) Inventors: Joshua Roszman, LaRue, OH (US); Grant Macdonald, Elgin, IL (US)

(73) Assignee: CNH Industrial America LLC, New Holland, PA (US)

( * ) Notice: Subject to any disclaimer, the term of this patent is extended or adjusted under 35 U.S.C. 154(b) by 115 days.

(21) Appl. No.: 14/568,546

(22) Filed: Dec. 12, 2014

(65) Prior Publication Data

US 2016/0165791 A1    Jun. 16, 2016

(51) Int. Cl.
A01C 7/08    (2006.01)

(52) U.S. Cl.
CPC .............. *A01C 7/084* (2013.01); *A01C 7/081* (2013.01)

(58) Field of Classification Search
CPC .......... A01C 7/082; A01C 7/081; A01C 7/084
USPC .................................................. 111/177–178
See application file for complete search history.

(56) References Cited

U.S. PATENT DOCUMENTS

| | | | |
|---|---|---|---|
| 3,482,735 A | 12/1969 | Goulter | |
| 4,145,981 A * | 3/1979 | Jimenez | A01C 7/16 111/65 |
| 4,193,523 A * | 3/1980 | Koning | A01C 9/08 111/171 |
| 4,243,154 A | 1/1981 | Freeman et al. | |
| 4,480,765 A | 11/1984 | Tonus | |
| 4,989,524 A | 2/1991 | Brown et al. | |
| 5,147,852 A | 9/1992 | Cowan et al. | |
| 5,740,747 A | 4/1998 | Stufflebeam et al. | |
| 7,237,495 B2 | 7/2007 | Harnetiaux | |
| 7,270,064 B2 * | 9/2007 | Kjelsson | A01C 7/081 111/174 |
| 7,316,110 B2 | 1/2008 | Schilling | |

(Continued)

FOREIGN PATENT DOCUMENTS

| | | |
|---|---|---|
| EP | 1449422 | 8/2004 |
| ES | 2228228 | 2/2008 |

(Continued)

OTHER PUBLICATIONS

"Stirring Shaft Assembly (TP40)", Covinginton Planter Co., Inc., www.covingtonplanter.com/Assets/covingtonpartscatalog09, Retrieved Dec. 12, 2014, 1 page.

*Primary Examiner* — John G Weiss
(74) *Attorney, Agent, or Firm* — Rebecca L. Henkel; Rickard K. DeMille

(57) ABSTRACT

The present invention is directed to a vibrator for seed delivery system that operates to vibrate seeds within the delivery system to enable the seeds to move through the system and into row meters that place the seeds into the desired location within a trench over which the discharge system is positioned. The vibrator is attached to an induction box and includes a housing in which an impeller is rotatably mounted. The impeller is driven by incoming air flow used to direct the seeds through the induction box, and includes a number of different sized vanes thereon. The rotation of the vanes creates mechanical vibrations in the induction box and directs a pulsed air flow through the induction box to minimize the bridging of seeds with one another within the induction box.

13 Claims, 6 Drawing Sheets

(56) References Cited

U.S. PATENT DOCUMENTS

| | | | | |
|---|---|---|---|---|
| 8,928,486 | B2 * | 1/2015 | Hui | A01C 7/081 340/608 |
| 9,148,994 | B1 * | 10/2015 | Eastin | A01C 1/06 |
| 9,265,190 | B2 * | 2/2016 | Johnson | A01C 7/081 |
| 9,468,141 | B2 * | 10/2016 | Audigie | A01C 7/081 |
| 2004/0163578 | A1 | 8/2004 | McDonald et al. | |
| 2010/0282142 | A1 | 11/2010 | Preheim et al. | |
| 2012/0174840 | A1 | 7/2012 | Friggstad | |
| 2014/0366497 | A1 * | 12/2014 | Noack | A01C 7/081 55/385.1 |
| 2015/0319917 | A1 * | 11/2015 | Henry | A01C 7/082 111/174 |

FOREIGN PATENT DOCUMENTS

| | | |
|---|---|---|
| GB | 417942 | 10/1934 |
| GB | 1094681 | 12/1967 |
| GB | 2026447 | 2/1980 |
| GB | 1603967 | 12/1981 |
| GB | 993732 | 6/1995 |
| WO | 2012142558 | 10/2012 |

\* cited by examiner

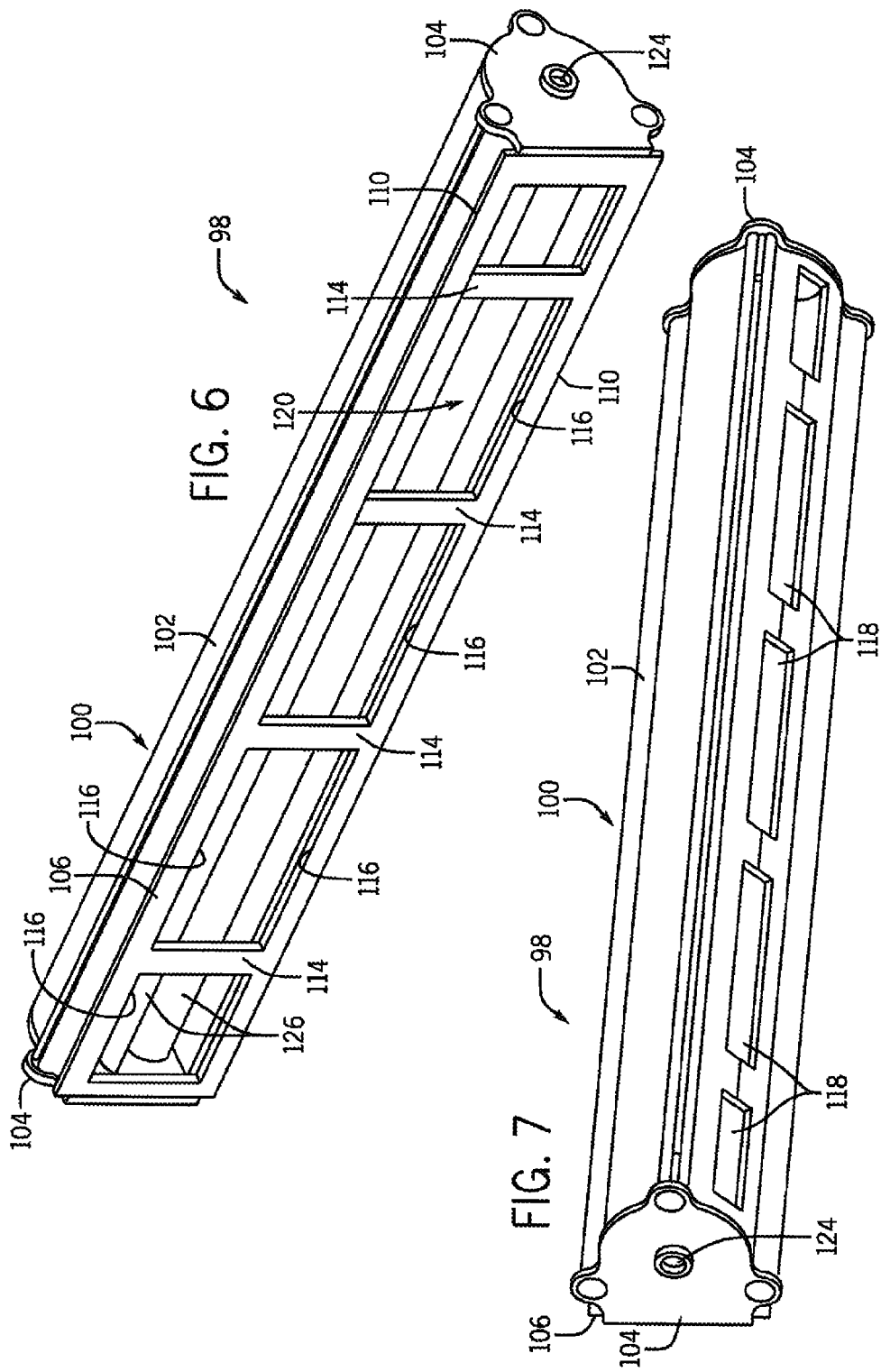

SEED DELIVERY SYSTEM VIBRATOR

FIELD OF THE DISCLOSURE

The present invention relates to a mechanism on a seeding machine for vibrating a inductor box of a seed distribution system in order to maintain fluidized seed flow through the inductor box.

BACKGROUND OF THE DISCLOSURE

A wide range of agricultural implements are known and are presently in use, particularly designed for towing behind a work vehicle, such as a tractor. In one family of such implements, including tillers, planters, and so forth, a wide swath of ground can be tilled, planted, or otherwise worked in each pass of the implement in a tilled or unfilled field. Planters or air seeders, for example, often include frames supported by series of wheels and a tool bar extending transversely with respect to a line of movement of the implement across the field. Attached to the tool bar are a series of row units for dispensing seeds in parallel rows either in tilled or unfilled soil. A pair of seed tanks are typically supported on the implement support structure, such as just forward of or over the tool bar. Large amounts of seed may be poured into these tanks and, as the implement is advanced across the field, seeds are transferred from the tanks by a distribution system connected to the row units.

The seeds dispensed from the tanks pass through seed distribution systems, such as induction boxes, under the influence of gravity which moves the seeds downwardly from the tank into the distribution system. Once in the distribution system, many different motive systems are utilized, such as air flows directed into the induction box, to move the seeds through the system and into row meters that in turn deliver the seeds into furrows or trenches formed in the ground over which the planter is travelling.

As the seeds move out of the tanks and through the distribution system under the influence of gravity and the air flow entering the distribution system, bridging is the main problem that occurs with the seeds. Bridging is caused by the seeds flowing through the same path in the system at the same time where they contact one another to form a bridge across the system. Further, the weight of the seeds packing tightly enough against one another in the box that the seeds become engaged with one another as a solid mass, such that the seeds no longer flow in a fluid manner through the induction box. In addition, sticky seed treatments that are often applied to the seeds increase the adherence of the seeds to one another, consequently increasing both the occurrences of bridging and the strength of the adherence of the seeds to one another when bridging does occur.

To assist in maintain the separation of the seeds in the distribution system and/or to break up bridging between the seeds when it occurs, distribution systems often employ vibration devices. These devices are most often secured to a housing for the distribution system, such as the induction box, and allows the seeds to fluidize as they flow through the inductor box. The vibrations provided to the box by the vibration device helps to prevent bridging and slugging during system operation, and maintains the air/seed mix ratio in a steady state. Many different types of vibrators or vibration devices are currently in use on existing distribution system including hydraulic, pneumatic, and electric devices.

While these vibration devices are effective in reducing the occurrences of bridging of the seeds in the distribution systems, these devices have the drawbacks of requiring a separate operating structure from the distribution system, especially in the case of mechanical and hydraulic devices, or requiring a complex and expensive construction to effect the vibration of the seeds as required. or both.

As a result it is desirable develop a vibration device for a seed distribution system that can effectively supply vibrations to the distribution system to minimize bridging of the seeds in the distribution system without requiring a separate operating system or a complex structural addition to the distribution system.

SUMMARY OF THE DISCLOSURE

According to one aspect of one exemplary embodiment of the present disclosure, a seed distribution system for a planter, air seeder or similar machine is provided that employs an vibration and air pulse device mounted on the housing for the seed distribution system that is operably connected to an air flow utilized to move the seed from a seed tank through the distribution system. The vibration and air pulse device includes an air movement member that is driven by the incoming air flow to the distribution system, and that causes the incoming air flow to be directed into the housing in a pulsed manner. The air movement member also includes vanes of different sizes. The different sized vanes create mechanical vibrations in the device that are transmitted to the housing of the seed distribution system. The mechanical vibrations and pulsed air flow into the housing for the distribution system effectively vibrate the seeds within the housing, thereby minimizing the time the seeds remain in contact with one another and reducing the occurrence of bridging of the seeds within the distribution system housing.

According to another aspect of one exemplary embodiment of the present disclosure, because the vibration and air pulse device is driven by the air flow already being used to move the seeds through the seed distribution system, the requirements for the construction and implementation of the vibration and air pulse device on the seed distribution system are significantly reduced from alternative vibration mechanisms used for this purpose.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure and preferred exemplary embodiments of the invention are illustrated in the accompanying drawings in which like reference numerals represent like parts throughout.

In the drawings:

FIG. 6 is a front perspective view of an air pulse device disposed in the indication box according to one exemplary aspect of the present invention; and FIG. 7 is a rear perspective view of an air pulse device disposed in the indication box according to one exemplary aspect of the present invention.

DETAILED DESCRIPTION OF THE DISCLOSURE

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like mean that there are one or more of the elements. The terms "comprising," "including," "having," and the like are inclusive and mean that there may be additional elements other than the listed elements. Moreover, the use of "top," "bottom," "above," "below," and variations of these terms does not require any particular orientation of the components relative to some extrinsic reference. e.g., gravity. As used herein, the term "coupled" refers to the condition of being directly or indirectly connected or in contact. Additionally, the phrase "in fluid communication" or "fluidly coupled" indicates that fluid or fluid pressure may be transmitted from one object to another. As used herein, the word "exemplary" means "an example" and not necessarily a preferred embodiment.

Figure 1:
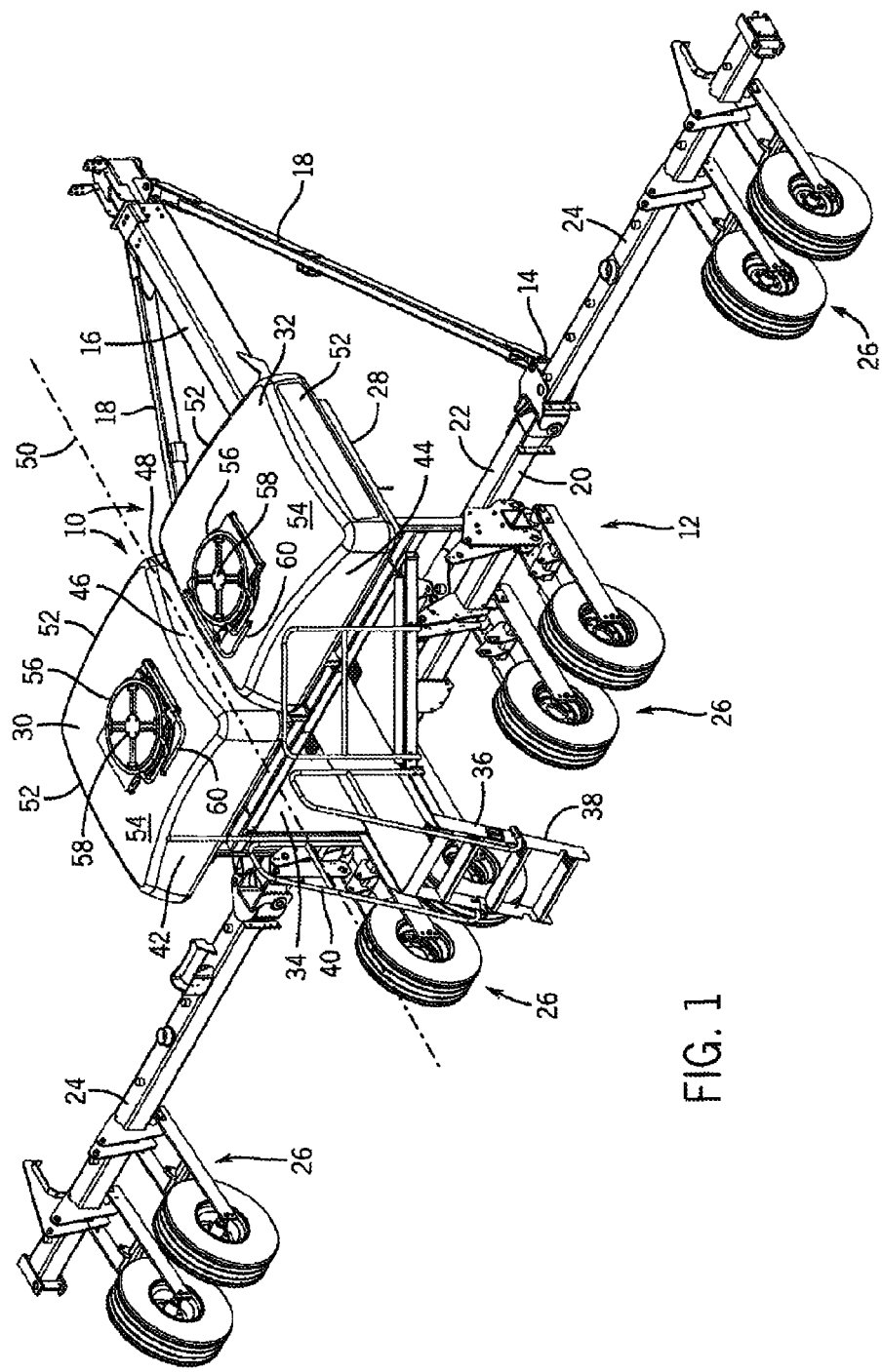
FIG. 1 is a rear perspective view of a planter in accordance including a seed distribution system according to an exemplary embodiment of the present invention.

Turning now to the drawings, and referring first to FIG. 1, seed tanks 10 are illustrated on an implement 12, illustrated in the form of a planter. The seed tanks 10 may be formed of steel or a moldable plastic material, such as polypropylene, by a plastic injection molding process, a rotomolding process, or any other suitable material. The implement 12 consists of a frame 14 and a tow bar 16 designed to be connected to a towing work vehicle, such as a tractor not shown). The frame 14 and tow bar 16 may be made of any suitable material, such as structural steel. Seed tanks 10 are supported by frame 14 and the attached structures. Draft tubes 18 extend rearwardly from a forward end of tow bar 16 to aid in drawing the implement 12. A tool bar 20 is coupled to the tow bar 16 and draft tubes 18 and supports row units designed to distribute seeds, as described below. As will be appreciated by those skilled in the art, the tool bar 20 may define a central section 22 and outwardly extending wings 24 that can be folded forwardly to reduce the overall width of the implement for road transport. Row units, not shown for the sake of clarity, may be mounted along the tool bar 20 to facilitate seed distribution. Wheeled supports 26 are attached to support frame 14 to allow the row units to be raised out of contact with road surfaces during transport of the implement.

In the exemplary illustrated embodiment, seed tanks 10 are mounted on tank support structures 28 and frame 14. These support structures typically include structural steel and truss members. Left tank 30 and right tank 32 sit atop the support structures 28. Platform 34 enables user access to fill and service seed tanks 10. Access ladder 36 and folding portion 38 provide operator entry to platform 34. Hand rails 40 allow greater stability to the operator when climbing access ladder 36 and servicing the tanks.

In the exemplary illustrated embodiment, rear sides 42 and 44 along with center-oriented sides 46 and 48 compose generally vertical sides of seed tanks 10. Centerline 50 runs along the center of the planter 12 where left tank 30 and its features are generally a mirror image of the right tank 32. Outwardly oriented sides 52 compose the outer generally vertical sides of seed tanks 10. The upper surface 54 of seed tanks 10 completes the enclosure and provides access to contents through a fill opening 56. Cover assemblies 58 close the openings in the seed tanks, and levers 60 cooperate with the cover assemblies to maintain the assemblies closed and thereby to secure the contents of seed tanks 10. Cover assemblies 58 may be removed for loading of seeds in automated, semi-automated or manual operations. The covers also permit inspection of the seeds, removal of debris, and so forth.

Figure 2:
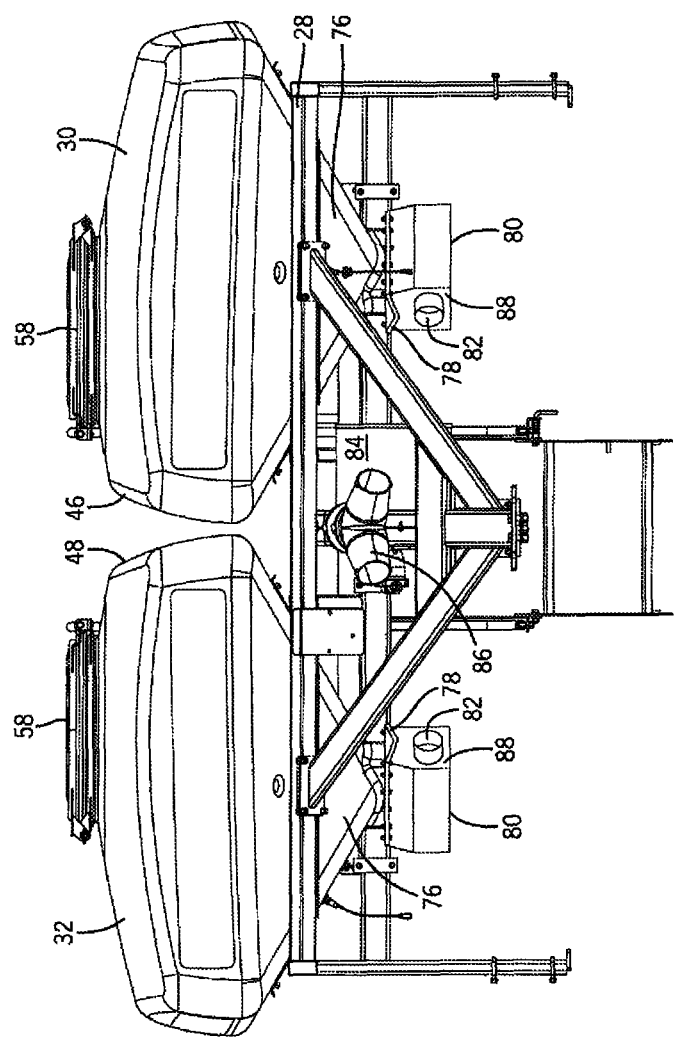
FIG. 2 is a detailed front view of the tanks and the frame that supports the tanks in accordance with aspects of the invention, including components of the seed distribution system.
Figure 3:
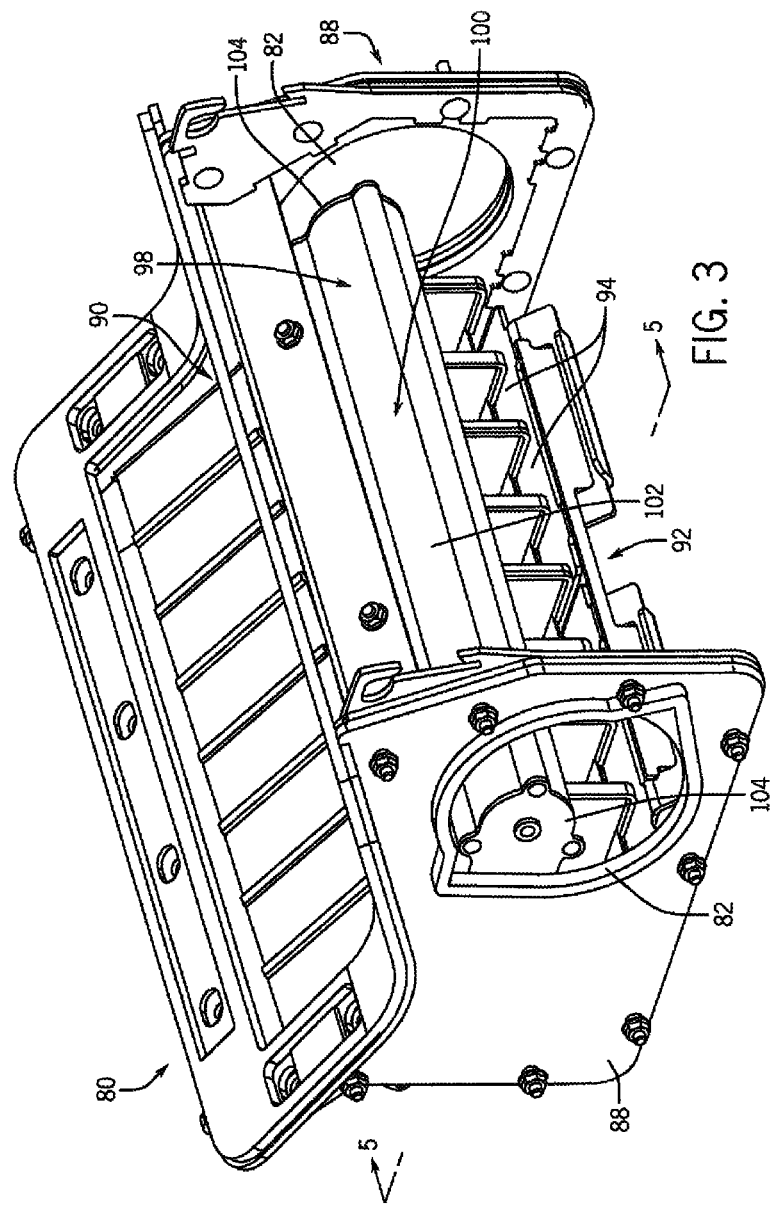
FIG. 3 is a perspective view of a housing for an induction box of the seed distribution system according to an exemplary embodiment of the present invention.

As shown in greater detail in FIG. 2, chutes 76 are located on the lower portion of left tank 30 and right tank 32. Flanges 78 connect chutes 76 to induction boxes 80. As will be appreciated by those skilled in the art, these components channel seed from tanks 30 and 32 through box outlets or discharge ends 92 to row units (not shown) located on the tool bar 20. Inlet openings 82 in the housing 88 for the boxes 80 are supplied air pressure from blower 84 through conduit 86 and tubes (not shown) forcing seeds from induction boxes 80 through the box outlets 92 to row units (not shown).

Figure 4:
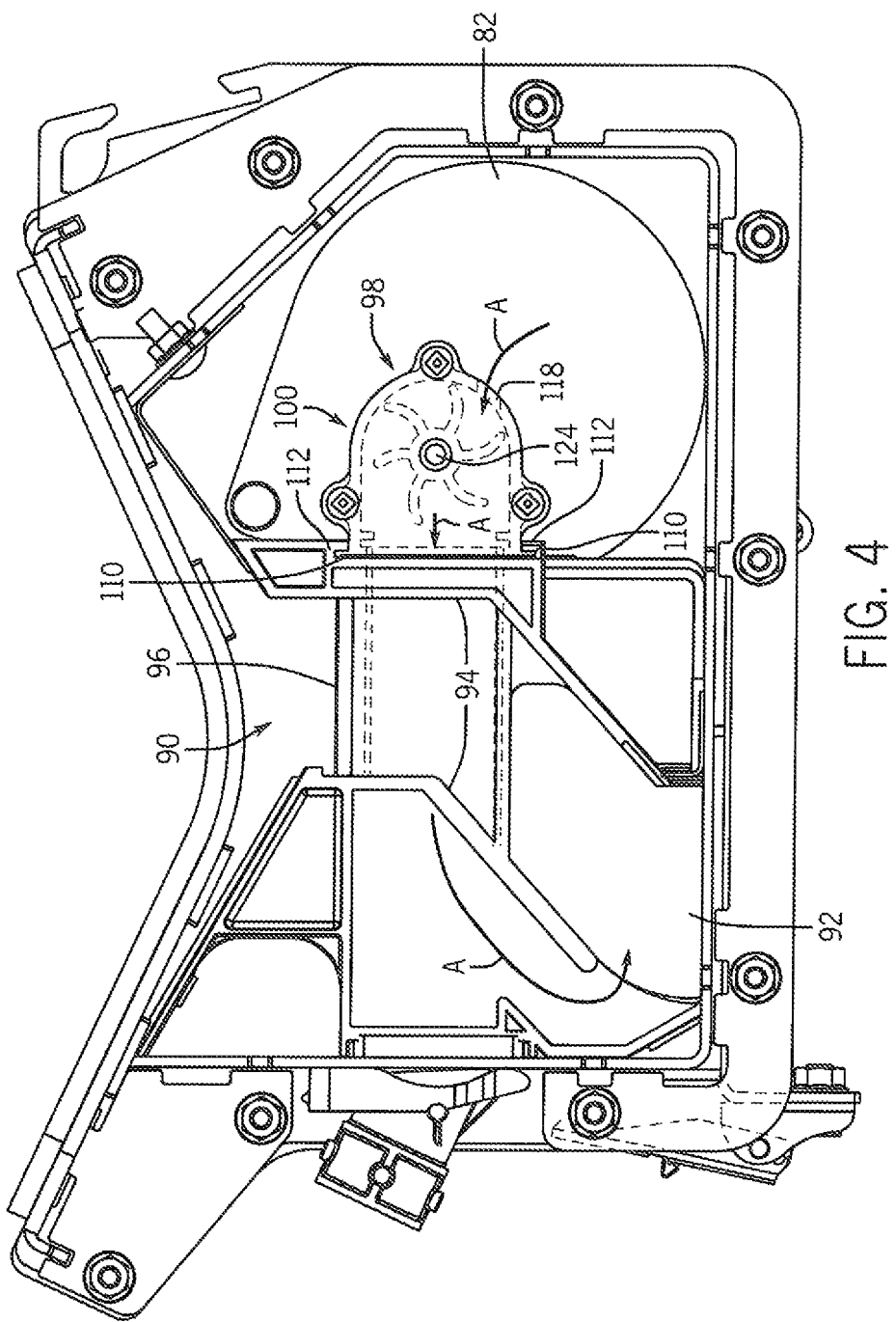
FIG. 4 is a side elevation view of the indication box of FIG. 3.

Referring now to the exemplary embodiment illustrated in FIGS. 3-7, an induction box 80 (shown with a central portion of the housing 88 removed for clarity) includes a seed inlet end 90 and a seed discharge end 92. As shown in FIG. 4 (shown with a side portion of housing 88 removed for clarity) the seed inlet end 90 is positioned against the chute 76 of the respective tank 30,32 and is connected to the discharge end 92 by a number of conduits 94 extending through the housing of the box 80. The seeds (not shown) are contacted by a flow of air A that enters the housing 88 through the inlet opening 82 and flows along an internal channel 96 extending from the air flow inlet opening 82 to the discharge end 92 of each conduit 94. The intersection of the channel 96 with the conduits 94 at the discharge end 92 enables the air flow to contact the seeds in the conduits 94 and push them out of the discharge end 92, while consequently exerting a pulling force on the seeds upstream of the discharge end 92 in each conduit 94, to move these seeds towards the discharge end 92.

Looking now specifically at the exemplary embodiment of FIGS. 4-7, disposed between the air flow inlet opening 82 and the channel 96 is a vibration or air pulsing device 98. The device 98 includes a housing 100 having a central member 102 and a pair of side plates 104 secured to opposed sides of the central member 100. Between the side plates 104, the central member 102 has a generally circular cross-sectional shape with a flat end surface 106 that is secured to the inlet 108 of the channel 96. In the illustrated exemplary embodiment, to secured the housing 100 to the inlet 108, the flat end surface 106 of the central member 102 includes outwardly extending edges or flanges 110 that are engaged within complementary grooves 112 around the inlet 108, though flanges 110 can alternatively be located on the side plates 104, or the housing 100 can be secured to the inlet 108 through other convention means.

The surface 106 includes a number of supports 114 extending between opposite sides of the surface 106 to define a number of exhaust or outlet apertures 116, where the outlet apertures 116 form the majority of the surface area of the surface 106 enabling a large air flow to pass through the surface 106 and into the channel 96.

The air flow that reaches the channel 96 though the outlet apertures 116 in the surface 106 enters the housing 100 through a number of inlet slots 118 disposed in the housing 100 generally opposite the outlet apertures 116, and in the illustrated embodiment in a lower portion of the housing 100. The inlet slots 118 are in fluid communication with the air flow inlet 82, such that the air flow entering the induction box 80 via the inlet opening 82 can enter the housing 100 via the inlet slots 118.

As the air flow entering the slots 118 passes through the housing 100 towards the outlet apertures 116, the air flow is contacted by an impeller 120 disposed within the housing 100. The impeller 120 extends the length of the housing 100 and includes a hub 122 rotatably disposed on a shaft 124 connected at each end to the side plates 104. A number of vanes 126 extend outwardly from the hub 122 and operate to obstruct the air flow through the housing 100 from the slots 118 towards the apertures 116. In the illustrated exemplary embodiment, the vanes 126 are curved to maximize the contact of the air flow entering through the slots 118 with the vanes 126 to rotate the impeller 120. As the air flow contacts the vanes 126, the impeller 120 is rotated around the shaft 124 such that the air flow can intermittently pass through the housing 100 with no or limited obstruction by the vanes 126.

Figure 5:
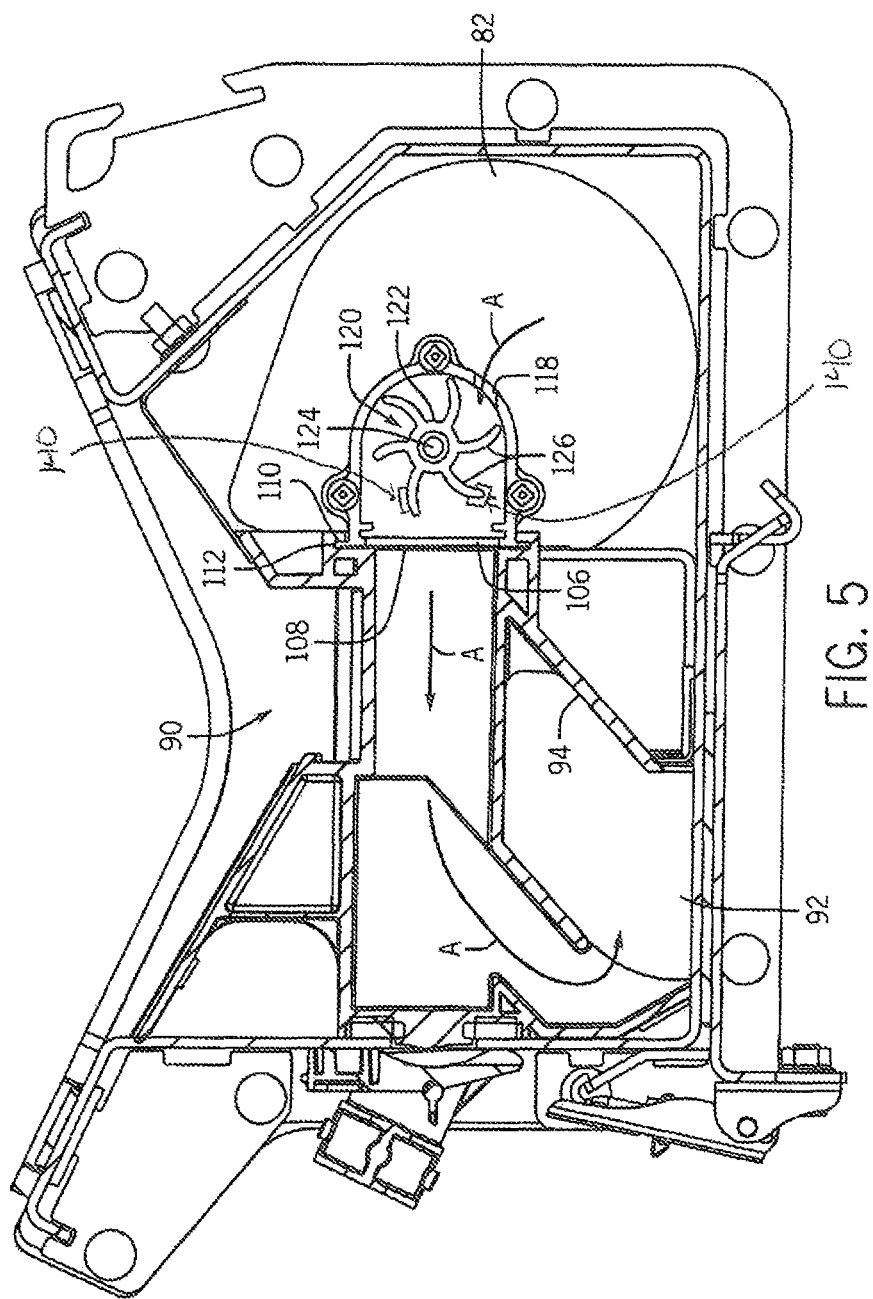
FIG. 5 is a cross-sectional view along line 5-5 of FIG. 4.

Additionally, the vanes 126 disposed on the hub 122 are of unequal length, as best shown in FIG. 5. As a result of the unequal length, the vanes 126 have different weights, which causes the impeller 120 to generate vibrations when rotated by the air flow. These mechanical vibrations are transmitted from the vanes 126 though the hub 122 and into the shaft 124 and side plates 104/housing 100. These vibrations also cause the induction box 80, and specifically the conduit 94, to vibrate due to the connection of the housing 100 to the conduit 94, thereby agitating the seeds passing through the conduit 94 to prevent the seeds from forming any bridges within the conduit 94. The size and number of the vanes 126 can be varied as desired in order to provide the desired amount of vibration to the induction box 80 through the mechanical vibrations transmitted to the conduit 94 and the pulsed air flow from the impeller 120.

Furthermore, the different sizes of the vanes 126 obstructs the air flow through the housing 100 in different manners. As a result, the position of the impeller 120 and the shape of the vanes 126 causes the air flow through the housing 100 to be pulsated as it enters the channel 96. The pulsed air flow from the device 98 travels along the channel 96 and contacts the seeds disposed in the conduit 94. Upon contact, the pulsed or pulsating air flow operates in conjunction with the mechanical vibrations transmitted to the seeds though the conduit 94 to vibrate the seeds present in the conduit 94 and separate and seeds that have begun to bridge across the conduit, as well as to improve seed lift from the pile of seeds in the respective tank 30. In this manner, the exemplary illustrated embodiment utilizes the device 98 including the impeller 120 that is driven only by the incoming air flow operates to vibrate the seeds in the conduit 94 of the induction box 80 to minimize bridging of the seeds as they pass through the box 80 without the need for any external power source or controls for the operation of the device 98.

In alternative embodiments, the housing 100 can include a number of impellers 120 disposed on the shaft 124, each impeller 120 having vanes 126 of varying sizes which creates mechanical vibrations and pulses the air flow through the housing at different rates or frequencies across the width of the housing 100, thereby providing a wider range of vibration to the seeds via the pulsed air flow. Further, in this or another embodiment the housing 100 can be formed with internal separating walls (not shown) extending across the housing 100 from the slots 118 to the exhaust apertures 116 to compartmentalize and enhance the pulsed air flow provided by each impeller 120. In addition, in any embodiment, the device 98 can optionally be used as a retrofit device on an existing planter or air seeder.

Additionally, as shown in FIG. 5, to enhance the strength of the vibrations provided by the vanes 126 on the impeller 120, weights 140 can be mounted to one or more of the vanes 126. The weights 140 can take any suitable configuration and can he mounted to the vanes 126 in any suitable manner. The weights 140 can also be formed of any suitable material, such as a metal, and can be configured to be positioned at discrete points on the vanes 126, or to extend the entire length of the vane 126 to which the weight 140 is secured.

Various other alternatives are contemplated is being within the scope of the following claims particularly pointing out and distinctly claiming the subject matter regarded as the invention.

We claim:

1. An induction box for a planter, the induction box comprising:
    a. a housing including a seed inlet end and a seed discharge end joined by a conduit having an outer surface and an inner surface defining a conduit channel for carrying seed therebetween, and an air flow inlet configured to be engaged with an air flow, the air flow inlet connected to the conduit adjacent the discharge end by a channel; and
    b. a vibration device disposed within the housing between the air flow inlet and the channel, the vibration device operatively connected to the outer surface of the conduit and configured to vibrate the conduit so to agitate seed in the conduit channel,
    wherein the vibration device includes a number of inlet slots disposed adjacent the air flow inlet and a number of exhaust apertures disposed adjacent the channel, and
    wherein the vibration device includes an impeller rotatably disposed between the inlet slots and the exhaust apertures.

2. The induction box of claim 1 wherein impeller includes a number of radially extending vanes.

3. The induction box of claim 2 wherein at least one of the vanes has a length different than the remaining vanes.

4. The induction box of claim 2 further comprising a weight mounted to at least one of the vanes.

5. The induction box of claim 1 wherein the impeller extends a length of the vibration device.

6. The induction box of claim 1 wherein the impeller is rotated only by air flow through the inlet slots.

7. A method for vibrating seed in an induction box of a planter, the method comprising:
    a. providing an induction box for a planter, the induction box including a housing including a seed inlet end and a seed discharge end joined by a conduit having an outer surface and an inner surface defining a conduit channel for carrying seed therebetween, and an air flow inlet configured to be engaged with an air flow, the air flow inlet connected to the conduit adjacent the discharge end by a channel;

b. operatively connecting a vibration device to the outer surface of the conduit such that the vibration device is disposed within the housing between the air flow inlet and the channel, the vibration device configured to vibrate the conduit so as to agitate seed in the conduit channel;

c. directing seeds into the seed inlet;

d. directing the air flow into the induction box via the air flow inlet;

e. pulsating the air flow in the vibration device by directing the air flow through a vibrating device disposed in the housing between the air flow inlet and the conduit; and f. directing the pulsating air flow into the conduit via the channel by directing the air flow into engagement with an impeller rotatably disposed within the housing.

8. The method of claim 7 wherein the step of directing the air flow into engagement with the impeller comprises directing the air flow against vanes of different lengths disposed on the impeller.

9. The method of claim 7 wherein the step of pulsating the air flow consists of directing the air flow into engagement with vanes of different lengths disposed on an impeller rotatably mounted within the vibration device.

10. An induction box for an agricultural implement including a housing having an seed inlet end and a seed discharge end joined by a conduit having an outer surface and an inner surface defining a conduit channel for carrying seed therebetween, and an air flow inlet configured to be engaged with an air flow, the air flow inlet connected to the conduit adjacent the discharge end by a channel, the induction box characterized by a vibration device disposed within the housing between the air flow inlet and the channel, wherein:

the vibration device is driven by the air flow from the air flow inlet;

the vibration device is operatively connected to the outer surface of the conduit;

the vibration device is configured to vibrate the conduit so to agitate seed in the conduit channel; and the vibration device includes an impeller rotatably mounted within the vibration device.

11. The induction box of claim 10 wherein the impeller includes a number of radially extending vanes thereon, the vanes having different lengths.

12. The induction box of claim 10 wherein the vibration device is driven only by air flow from the air flow inlet.

13. An induction box for a planter, the induction box comprising:

a. a housing including an seed inlet end and a seed discharge end joined by a conduit, and an air flow inlet configured to be engaged with an air flow, the air flow inlet connected to the conduit adjacent the discharge end by a channel; and b. a vibration device disposed within the housing between the air flow inlet and the channel, the vibration device includes:

a number of inlet slots disposed adjacent the air flow inlet and a number of exhaust apertures disposed adjacent the channel; and an impeller rotatably disposed between the inlet slots and the exhaust apertures, the impeller includes a number of radially extending vanes; and c. a weight mounted to at least one of the vanes;

wherein at least one of the vanes has a length different than the remaining vanes.

* * * * *